(No Model.)

F. A. NEIDER.
PROP BLOCK WASHER.

No. 244,761. Patented July 26, 1881.

WITNESSES:
E. B. Bolton
Geo. Bainton

INVENTOR:
Fred'k A. Neider.
By his Attorneys,
Burke, Fraser & Connett

UNITED STATES PATENT OFFICE.

FRED A. NEIDER, OF AUGUSTA, KENTUCKY.

PROP-BLOCK WASHER.

SPECIFICATION forming part of Letters Patent No. 244,761, dated July 26, 1881.

Application filed April 11, 1881. (No model.)

*To all whom it may concern:*

Be it known that I, FRED A. NEIDER, a citizen of the United States, residing at Augusta, in the county of Bracken and the State of Kentucky, have invented certain Improvements in Prop-Block Washers, of which the following is a specification.

The prop-irons of carriages are of different sizes, varying from one-half of an inch to five-eighths of an inch square. The cushion or "block," which is slipped over the iron, is usually cylindrical, and made from some soft material, as leather or rubber. To form a finish for the ends of the block or cushion some form of washer has usually been employed. These have been made of leather, rubber, and other materials; but so far as I am aware none of them has combined the elements of neatness, cheapness, durability, and adaptability to irons of all sizes so fully as that which I will now describe.

The object of my invention is to provide a cheap, neat, and durable washer that will fit snugly and elastically on prop-irons of all the various sizes within the usual limits, and will be held elastically thereon, so as to not rattle.

Figure 1:
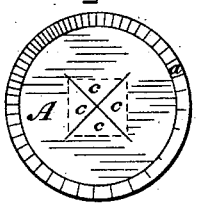
Figure 2:
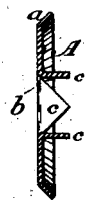
Figure 3:
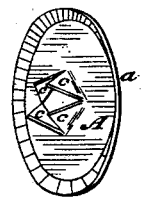
Figure 4:
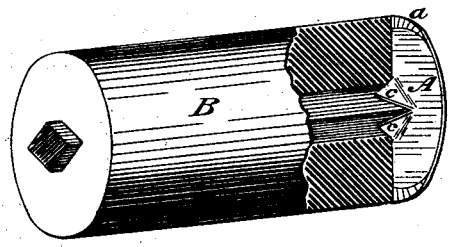

In the drawings which serve to illustrate my invention, Figure 1 is a view of the washer partly completed. Fig. 2 is a vertical mid-section of the same completed by pressing out the points to form the square central aperture. Fig. 3 is a perspective view of the washer. Fig. 4 is a perspective view, showing the application of the washer to the prop iron and block.

A is the washer, made from tin or other sheet metal. This washer, in its outer contour, corresponds in shape with the end of the block or cushion B, and is provided by preference with an ornamental flange or rim, $a$. The square aperture $b$ in the center of the washer is formed preferably by cutting two cross-slits (see Fig. 1) in the same, and then bending up the four angular points $c\ c$ thus formed. The aperture made in this manner is a little too small to admit the smallest prop-iron, whereby when the latter is forced through it the aperture is enlarged by the prolongation of the slits at the angles, the force being sufficient to rupture the metal. The points $c$ exert sufficient elastic pressure on the iron to prevent rattling, and they also wedge themselves between the soft material of the block and the iron, and thus serve in some degree as holdfasts. The cross-slits may be extended a little way beyond the line upon which the points are bent up, (indicated by dotted lines in Fig. 1;) but this is not necessary, as the sharp angles of the prop-iron may be relied upon to enlarge the opening properly. It is not necessary that all of the angular points $c\ c$ be retained—that is to say, a portion of each point may be clipped off.

Having thus described my invention, I claim—

The combination, with the square prop-iron and the prop-block, of a washer of sheet metal having a square aperture to fit the prop-iron, and retaining-points formed thereon to elastically grasp the prop-iron and prevent rattling, substantially as shown and specified.

In witness whereof I have hereunto signed my name in the presence of two subscribing witnesses.

FRED A. NEIDER.

Witnesses:
PETER CAMPBELL,
JOHN A. HOPKINS.